UNITED STATES PATENT OFFICE.

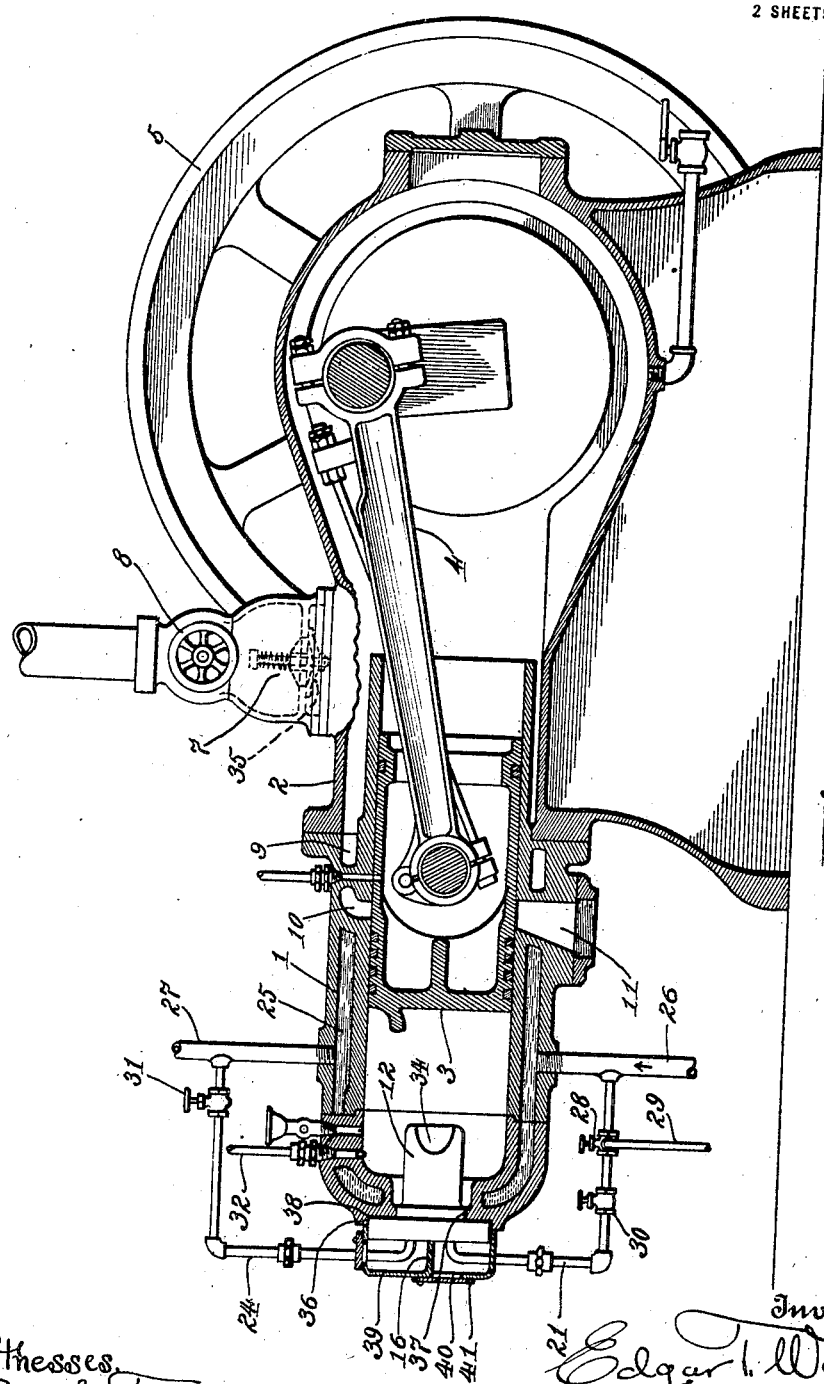

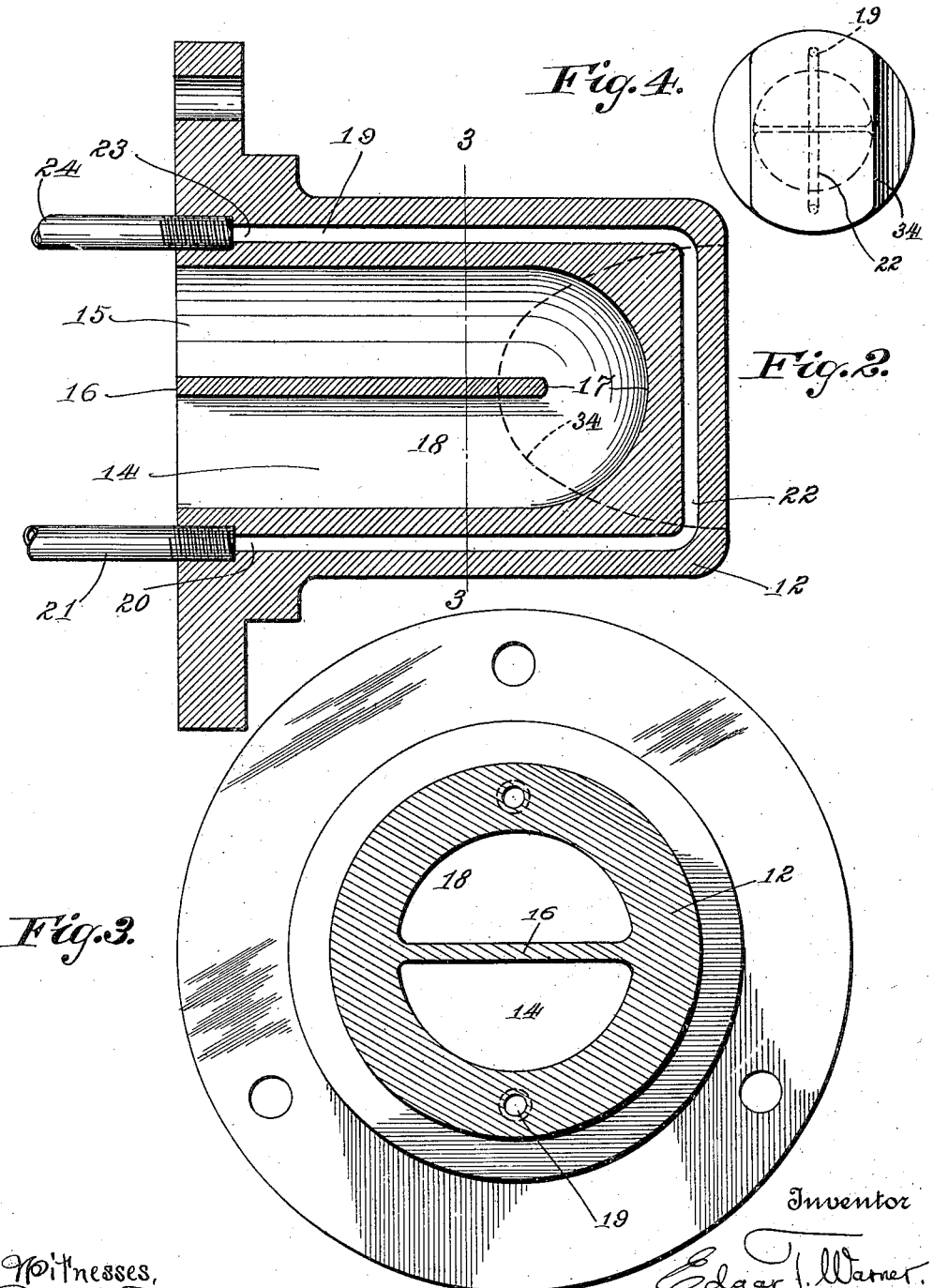

EDGAR T. WARNER, OF ST. MICHAELS, MARYLAND.

IGNITION.

1,376,057.

Specification of Letters Patent. Patented Apr. 26, 1921.

Application filed January 6, 1920. Serial No. 349,758.

*To all whom it may concern:*

Be it known that I, EDGAR T. WARNER, a citizen of the United States of America, residing in the town of St. Michaels, State of Maryland, have invented certain new and useful Improvements in Ignition, of which the following is a specification.

This invention relates to an ignition system for internal combustion engines. Electrical ignition has practically superseded all others where flexibility is desirable, but where cheapness of operation, and simplicity and consequent low cost of maintenance are primary requisites, the employment of electricity, particularly in stationary engines where a low grade of fuel is used, is a considerable item either in the matter of the cost of an efficient system or the maintenance of a cheap one.

The object of the invention is to provide as a substitute for electrical and other types of ignition, an ignition system which is of the simplest construction so that it cannot get out of order and which is at the same time capable of being installed at a very low cost and maintained and operated practically without expense.

The ignition system which is the subject of the invention is of the hot plug or hot spot type. This type of ignition is not unknown to the art, but as previously used it has not been so satisfactory as to be considered a commercial success according to modern standards. When operated without cooling they cause preignition or destructive distillation of the fuel, and are of very short life on account of burning of the metal, and such attempts as have been made to operate them in connection with a cooling means have been unsatisfactory. Notably cooling has been accomplished by the injection of water into the combustion space. This has been found objectionable and wholly unsatisfactory because the water has a tendency to get into the clearance between the piston and the cylinder wall, expelling the lubricating fluid or cylinder oil and causing excessive wear which soon makes the plant inoperative.

The invention comprises a water jacketed hot spot plug, with means providing for heating the same preliminarily in starting and means for draining the jacket while heating, the same being in some forms of the invention combined with a particular type of fuel feed.

In the preferred form of the invention as shown the hot spot plug has a water jacket adjacent the surface with an inner chamber to afford access to the metal of which the plug is formed at a point adjacent the ignition surface, so that the plug may be heated from within for the purpose of starting, the circulation being cut off for this purpose and the jacket preferably drained.

As shown, the plug is used in combination with means for feeding compressed air to the combustion space at the time the burnt charge is being exhausted, the fuel being fed to the heated surface of the plug preferably when the valves are closed impact against the hot surface giving just sufficient heating, vaporization and mixing of the charge with the air.

In the accompanying drawing I have illustrated a stationary engine arranged in accordance with my invention, and the details of a hot spot plug which is a feature of the same.

Figure 1 is a vertical central section of the engine.

Fig. 2 is a longitudinal section of the plug.

Fig. 3 is a transverse section on the line 3, 3 of Fig. 2.

Fig. 4 is an elevation of the point or operative end of the plug.

Referring to the drawings by numerals, the engine structure disclosed in Fig. 1 is of the two cycle type including a cylinder casting 1 and crank case 2 with a piston 3, connecting rod 4 and fly wheel 5. Air is supplied to the crank case by way of a suitable passage 7 controlled by a throttle 8 from the crank case. The air passes from the crank case to the cylinder or combustion space by way of a passage 9 and port 10 in the cylinder wall, the same being controlled by the piston which covers and uncovers it at the proper periods according to regular two cycle engine practice. The exhaust port 11 on the opposite side of the cylinder is similarly controlled.

An important feature of the invention resides in the ignition plug 12 referred to herein as a hot spot plug. This plug as shown in detail in Figs. 2 and 3 is preferably made with a central chamber at 14, the same being open at the head or exposed end of the plug at 15, and preferably having a baffle 16 spaced from the inner end of the plug at 17 to provide a heating passage 18 so that a blow torch applied at one end of the passage sets up a circulating draft about the baffle, raising the temperature of the plug in the shortest possible time and with the least expenditure of fuel. The plug as shown has a water jacket 19 adjacent the surface, the same being shown in the form of a narrow passage substantially of a U-shape which enters the plug at one side at 20, being fed by a suitable feed pipe 21, crosses the head of the plug at 22 and leaves the plug at 23, being connected to a suitable return pipe 24. The pipes 21 and 24 form part of the regular circulating cooling system which includes a jacket 25 with supply and return pipes 26 and 27, to which pipes 26 and 27 the plug feed pipe 21 and return pipe 24 are connected respectively. The sides of the plug are cut away at 34 near the end to reduce the surplus metal and increase the cooling and heating efficiency. The pipe 21 includes a three-way valve 28 by which the water supply may be cut off and drained at will by means of a drain pipe 29. It also includes a regulating valve 30, and the return pipe 24 includes a shut-off valve 31.

In the form of the invention shown, the fuel, preferably heavy oil under pressure, is fed to the cylinder by way of a nozzle or fuel supply pipe 32, the same being preferably directed against the hot spot plug 12 for purposes of vaporization and ignition. It will be noted by examination of Fig. 1 that the rear end of the plug is seated in the cylinder wall, having its circumferences 36, 37 formed to fit the opening 38 of corresponding diameters in the cylinder wall. This end of the plug has a casing 39 to inclose the heating chamber 14, the same serving as a support for the baffle 16 and having an opening 40 with a cover 41 for the insertion of the blow torch in heating the passage. This cover is apertured to receive the ignition plug cooling circulation pipes 21 and 24.

In operation air is, as already pointed out, drawn into the crank case by way of the passage 7 which is fitted with a suitable non-return valve 35, and being compressed in the crank case, is forced into the cylinder at the end of the stroke, cooling the cylinder, driving out the burned charge through the exhaust port 11 which is open at this time, and supplying air for the combustion of the next charge. As the piston returns the old charge, having been driven out and replaced by air and the valves closed, fuel is sprayed by way of the pipe 32 against the plug 12. This is suitably vaporized by the heat of the plug or where vaporization is impossible, is at least atomized, and when necessary compression is reached, the charge is ignited, producing the power stroke.

When the engine is hot it will start without difficulty. In starting when cold the water is withdrawn from the plug jacket by closing shut-off valve 31 and turning the valve 28, and the plug is heated by means of a blow torch applied to the passage 18, setting up a circulation of the hot products of combustion through this passage around the baffle 16.

After starting, the three-way valve 28 is turned to permit the entrance of water into the plug jacket, and the flow of water is controlled by means of the regulating valves 30 and 31. These are preferably set once for all to give the desired circulation, and their position is not changed during starting and stopping.

The invention resides particularly in the heat retaining, vaporizing and ignition device with provision for reducing and regulating the temperature of the same to prevent destruction of the ignition device by overheating and to maintain the desired temperature for treating the charge in order to bring it to the desired condition particularly as to temperature and distribution for combustion and to ignite it in proper sequence.

I have thus described a structure embodying my invention specifically and in detail in order that its nature and operation may be clearly understood; however, the specific terms herein are used in a descriptive rather than in a limiting sense, the scope of the invention being defined in the claims.

What I claim and desire to secure by Letters Patent is:

A heat retaining ignition member in the form of a plug projecting into the combustion space, the plug operating to ignite the new charge by means of the heat retained from the combustion of the preceding charge, the plug having a passage of small cross-section for cooling fluid, means for regulating the flow of the fluid through the passage, and a chamber with an external opening whereby a heating means may be applied to raise the temperature of the ignition member in starting, the chamber having an intermediate baffle to direct a fluid heat carrying medium in contact with the walls of the heating chamber.

Signed by me at St. Michaels, Maryland, this 15th day of September, 1919.

EDGAR T. WARNER.

Witnesses:
A. D. J. MORRIS,
GEO. H. BARNES.